(12) United States Patent  (10) Patent No.: US 12,370,023 B2
Chen                          (45) Date of Patent:    Jul. 29, 2025

(54) SINUS DENTAL IMPLANT

(71) Applicant: STAR GENERATION LIMITED, New Taipei (TW)

(72) Inventor: Chun-Leon Chen, Taipei (TW)

(73) Assignee: STAR GENERATION LIMITED, New Taipei (TW)

( * ) Notice: Subject to any disclaimer, the term of this patent is extended or adjusted under 35 U.S.C. 154(b) by 310 days.

(21) Appl. No.: 17/971,228

(22) Filed: Oct. 21, 2022

(65) Prior Publication Data

US 2023/0355358 A1     Nov. 9, 2023

(30) Foreign Application Priority Data

May 5, 2022 (TW) ................................. 111117031

(51) Int. Cl.
*A61C 8/00* (2006.01)

(52) U.S. Cl.
CPC .................................. *A61C 8/0021* (2013.01)

(58) Field of Classification Search
CPC ... A61C 8/0021; A61C 8/0024; A61C 8/0037; A61C 8/0039; A61C 8/022; A61C 8/0092; A61C 8/0089; A61C 8/0043; A61B 17/1688
See application file for complete search history.

(56) References Cited

U.S. PATENT DOCUMENTS

| | | | | |
|---|---|---|---|---|
| 4,820,156 A | * | 4/1989 | Ross | A61C 8/0018 433/165 |
| 5,316,476 A | * | 5/1994 | Krauser | A61C 8/0018 433/173 |
| 5,366,374 A | * | 11/1994 | Vlassis | A61C 8/0039 433/165 |
| 2010/0081111 A1 | * | 4/2010 | Better | A61C 19/06 433/215 |
| 2012/0323243 A1 | * | 12/2012 | Moon | A61C 8/0089 606/80 |
| 2013/0045462 A1 | * | 2/2013 | Tzeng | A61C 8/0018 433/174 |
| 2015/0086942 A1 | * | 3/2015 | Hwang | A61C 8/0069 433/174 |
| 2015/0297321 A1 | * | 10/2015 | Chen | A61C 8/0025 433/174 |
| 2015/0297323 A1 | * | 10/2015 | Chen | A61C 8/0068 433/174 |
| 2022/0160371 A1 | * | 5/2022 | Huwais | A61B 17/1644 |

* cited by examiner

*Primary Examiner* — Jacqueline T Johanas
*Assistant Examiner* — Shannel Nicole Belk
(74) *Attorney, Agent, or Firm* — Rabin & Berdo, P.C.

(57) ABSTRACT

A sinus dental implant includes a main body, an external thread, and a plurality of spiral cutting flutes. The main body has opposite connection end and drilling end. The drilling end has a centered recess surrounded by a drilling zone and communicable with the spiral cutting flutes. The external thread and the spiral cutting flutes are extended in two different spiral directions. The drilling zone is divided by the spiral cutting flutes into a plurality of drilling segments, each of which has two sides located at different heights to thereby include a lower and an upper drilling portion. When the sinus dental implant is implanted into an alveolar hole to contact with a bottom thereof, the lower drilling portions at the drilling end cut the bottom of the alveolar hole slowly, so that the sinus dental implant can drill further in the alveolar hole instead of idling therein.

9 Claims, 16 Drawing Sheets

SINUS DENTAL IMPLANT

FIELD OF THE INVENTION

The present invention relates to a sinus dental implant for implanting into a patient's upper gum, and more particularly, to a sinus dental implant for implanting into an alveolar hole and having a drilling end capable of cutting a bottom of the alveolar hole slowly when it is in contact with the bottom, so that the sinus dental implant can cut and move further instead of idling in the alveolar hole.

BACKGROUND OF THE INVENTION

There are two stages of tooth growth. Teeth erupted in the first stage are baby teeth, which are then shed and replaced with permanent teeth in the second stage. The permanent teeth are harder than the baby teeth and will not grow back if they fall out due to any reason. Therefore, in the event a permanent tooth has a serious defect, such as tooth decay or a tooth breaking, the defective tooth is either repaired locally or extracted entirely. Defective permanent tooth or extraction of permanent tooth not only adversely affects the appearance of teeth, but also causes difficulties in chewing and speaking. Presently, patients having the problem of defective tooth would usually visit a dentist to avoid the condition of tooth dislocation.

Following the constant progress in the dental repair technique, some patients now try to repair their defective tooth using an artificial dental implant. In the process of dental implantation, an alveolar hole is first drilled into the patient's alveolar bone with drill bits and the artificial dental implant is then implanted into the alveolar hole, such that a part of the dental implant is located in the alveolar hole while the remaining part of the dental implant is exposed from the alveolar hole to connect to an artificial crown.

However, in the case of implanting the dental implant into a patient's upper gum that is relatively thin in its thickness, the dentist would usually use a sinus dental implant. Please refer to FIGS. 1A and 1B. A conventional sinus dental implant 50 includes a main body 51, an external thread 52, and a plurality of spiral cutting flutes 53. The main body 51 includes a drilling end 511 and a connection end 512 located opposite to the drilling end 511. The drilling end 511 has a recess 511a formed at a central area thereof and a drilling zone 511b formed around the recess 511a. The external thread 52 is formed on an outer peripheral wall surface of the main body 51. More specifically, each of the spiral cutting flutes 53 is formed on the external thread 52 to extend from the drilling zone 511b toward the connection end 512 and is communicable with the recess 511a. As shown, the drilling zone 511b is divided by the spiral cutting flutes 53 into a plurality of drilling segments 511b1, which are circumferentially spaced along the recess 511a, and each of the drilling segments 511b1 is horizontal in configuration, such that axially outer surfaces of all the drilling segments 511b1 are located at the same level.

Please refer to FIG. 1C. Before implanting the conventional sinus dental implant 50 into the patient's upper gum 54, the dentist first use drill bits to drill and cut an alveolar hole 541 into the upper gum 54. The alveolar hole 541 has a profile smaller than the conventional sinus dental implant 50. Then, the dentist implants the conventional sinus dental implant 50 into the alveolar hole 541. When the drilling end 511 of the conventional sinus dental implant 50 is in contact with a bottom of the alveolar hole 541, the drilling segments 511b1 are in surface contact with the alveolar hole bottom. At this point, when the conventional sinus dental implant 50 is rotationally driven into the upper gum 54, the drilling segments 511b1 in surface contact with the bottom of the alveolar hole 541 and the dentist's accustomed operational manner often cause the drilling end 511 to idle in the alveolar hole 541 without cutting the same any further, so that the conventional sinus dental implant 50 fails to stably and constantly drill the bottom of the alveolar hole 541.

When the conventional sinus dental implant 50 is idling in the alveolar hole 541, the dentist surely would apply more force to drive the drilling end 511 of the conventional sinus dental implant to drill the bottom of the alveolar hole 541. However, the conventional sinus dental implant 50 being driven with excessively applied force would possibly penetrate the upper gum 54 to injure a sinus membrane 542 located closely above the upper gum 54.

SUMMARY OF THE INVENTION

A primary object of the present invention is to provide an improved sinus dental implant for implanting into an alveolar hole. The improved sinus dental implant has a drilling end that can cut and drill a bottom of the alveolar hole slowly when it is in contact with the bottom, not only preventing the improved sinus dental implant from drilling the bottom of the alveolar hole excessively to result in injured sinus membrane, but also preventing the sinus dental implant from idling in the alveolar hole without moving further and leaving the bottom of the alveolar hole uncut.

To achieve the above and other objects, the sinus dental implant according to the present invention for implanting into a patient's alveolar hole includes a main body, an external thread, and a plurality of spiral cutting flutes.

The main body has two opposite ends defined as a drilling end and a connection end, and an embedment peripheral surface extended from the drilling end toward the connection end. The drilling end has an outer peripheral area formed into a drilling zone capable of contacting with a bottom of the alveolar hole and a sunken central area formed into a recess surrounded by the drilling zone.

The external thread is formed on the embedment peripheral surface of the main body to extend in a first spiral direction for engaging with a side wall surface of the alveolar hole. The spiral cutting flutes are formed on the main body and the external thread to extend from the drilling zone in a second spiral direction, which is opposite to the first spiral direction, such that a cut is formed between every spiral cutting flute and the recess, and the spiral cutting flutes are communicable with the recess via the cuts.

The drilling zone is divided by the spiral cutting flutes into a plurality of drilling segments, that are circumferentially spaced along the recess. Every drilling segment has a lowest portion defined as a lower drilling portion, from the lower drilling portion of the drilling segment rises gradually toward one of the spiral cutting flutes to form an upper drilling portion, and a guide surface is formed between the lower drilling portion and the upper drilling portion while a guide space is also formed between the lower drilling portion and the upper drilling portion to communicate the recess with the spiral cutting flute.

In a preferred embodiment, the lower drilling portion is located adjacent to one of the spiral cutting flutes, while the upper drilling portion is located adjacent to another one of the spiral cutting flutes.

In another preferred embodiment, the main body includes a plurality of notches, the notches are respectively formed on one of the spiral cutting flutes at a position adjacent to the lower drilling portion.

In a further preferred embodiment, the lower drilling portion is located at a middle position of every drilling segment, and the drilling segment further extends upward from the lower drilling portion toward another one of the spiral cutting flutes to form a secondary upper drilling portion that is located opposite to the upper drilling portion, such that a secondary guide surface is formed between the lower drilling portion and the secondary upper drilling portion; and the upper drilling portion and the secondary upper drilling portion are respectively located adjacent to one of the spiral cutting flutes.

In the above three preferred embodiments, the guide surface is a slanting surface slantly extended from the lower drilling portion toward the upper drilling portion, and a gradient ranged between 1 and 10 degrees, which is smaller than a gradient of the external thread.

Further, the recess is blocked by the drilling zone to be spaced from the external thread, such that all lower drilling portions and all upper drilling portions are located between the recess and the external thread. A height position of the drilling zone relative to the main body is lower than the lowest point of the external thread, preventing the external thread from contacting with the bottom of the alveolar hole. And, every lower drilling portion is extended in a direction from a center of the recess toward an outer periphery of the drilling zone, and the upper drilling portions are extended in a direction tangential to an opening of the recess.

The whole external thread is formed only on a part of the embedment peripheral surface on the main body, such that the part of the main body with the external thread is defined as a first implant body, and other part of the main body without the external thread is defined as a second implant body. The recess is formed on the second implant body.

The spiral cutting flutes respectively include a first cutting flute section and a second cutting flute section. The first cutting flute section is formed only on the external thread, and the second cutting flute section is formed on both of the main body and the external thread. The upper drilling portion, the guide surface and the lower drilling portion on each of the drilling segments are sequentially arranged in the first spiral direction.

Each of the lower drilling portions includes a linear blade edge capable of cutting the bottom of the alveolar hole, and each of the spiral cutting flutes has a radially outmost portion that is formed into a plurality of spirally arranged blade edges capable of cutting the alveolar hole. A shape of the linear blade edges are respectively different from the spirally arranged blade edges.

The sinus dental implant of the present invention is characterized in that the drilling end includes a plurality of drilling segments, each of which has a height decreased gradually from one of the spiral cutting flutes toward another one of the spiral cutting flutes, so that the lower drilling portion and the upper drilling portion of each drilling segment are located at different height positions. When the sinus dental implant is implanted into the alveolar hole to reach the bottom thereof, the lower drilling portions of the sinus dental implant are the first parts of the sinus dental implant that contact with the bottom, making the whole drilling end of the sinus dental implant in line contact with the bottom. Therefore, with the lower drilling portions, the drilling end of the sinus dental implant in contact with the bottom of the alveolar hole can still cut and drill the bottom slowly without cutting the same excessively to result in injured sinus membrane. Further, the sinus dental implant with the above described drilling end enables the lower cutting portions in contact with the bottom of the alveolar hole to keep moving forward and cut the bottom of the alveolar hole instead of idling therein.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
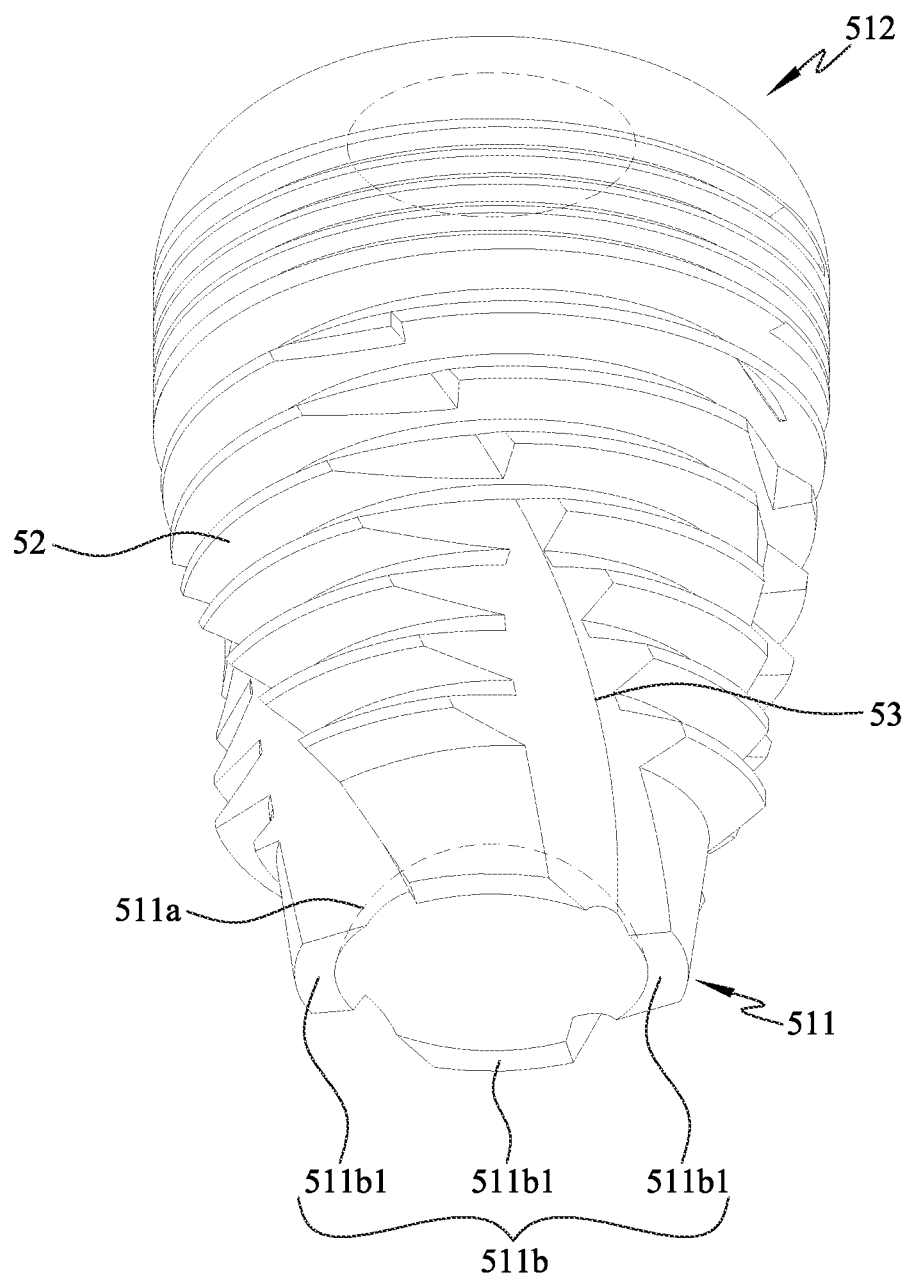
FIG. 1A is a perspective view of a conventional sinus dental implant.
Figure 1B:
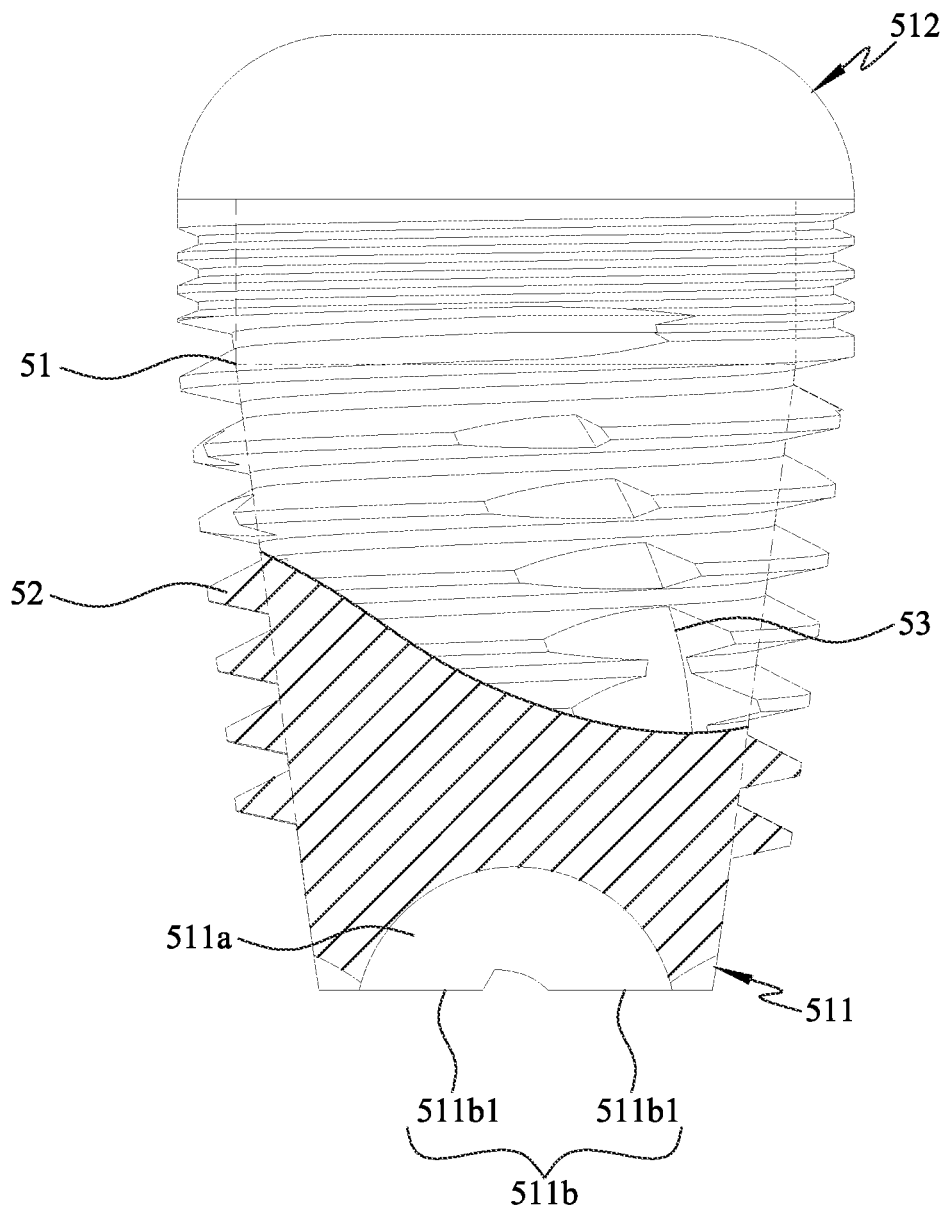
FIG. 1B is a side view of the conventional sinus dental implant of FIG. 1A.
Figure 1C:
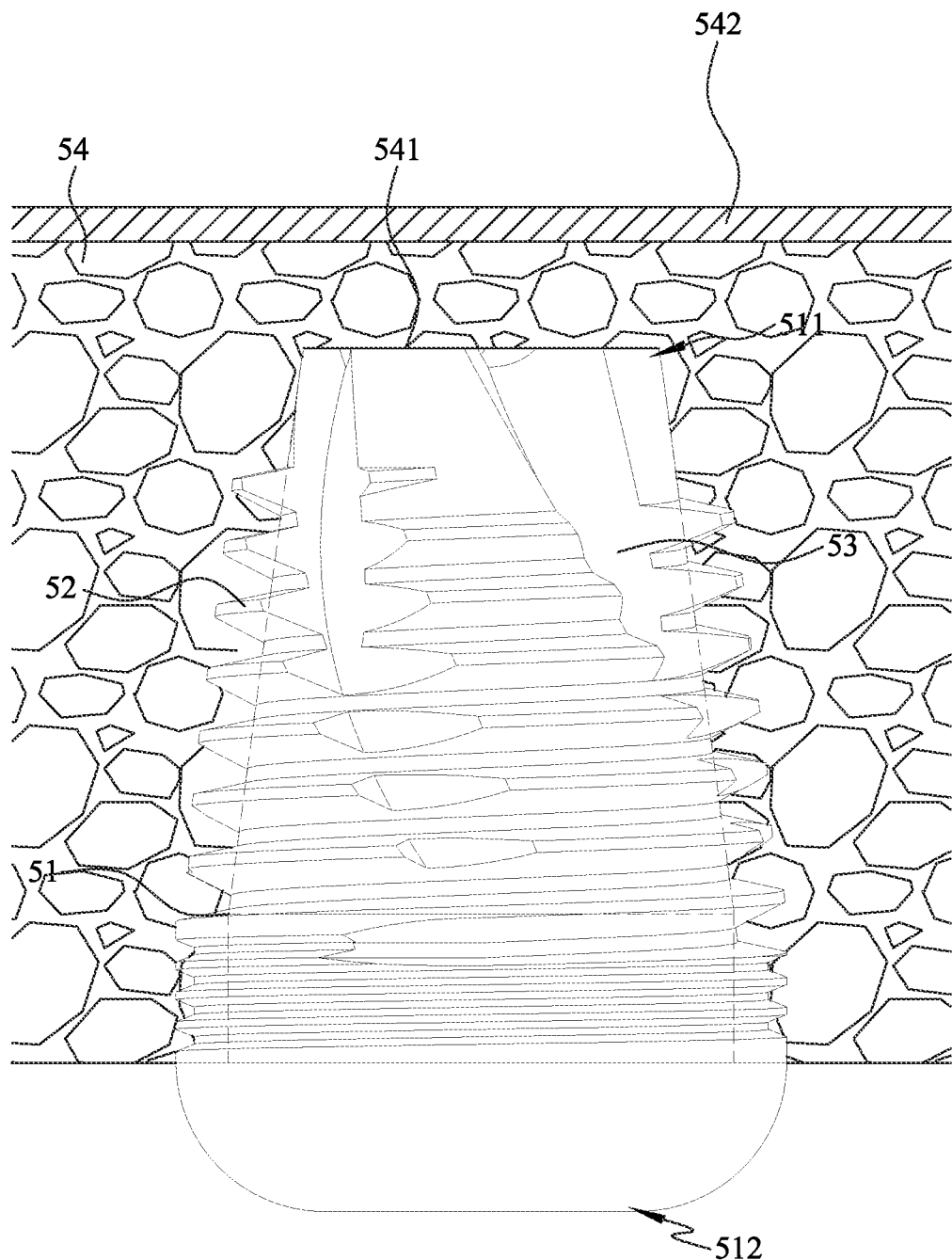
FIG. 1C shows the conventional sinus dental implant of FIG. 1A is implanted into a patient's upper gum.

The present invention will now be described with some preferred embodiments thereof and by referring to the accompanying drawings. For the purpose of easy to understand, elements that are the same in the preferred embodiments are denoted by the same reference numerals.

Figure 2:
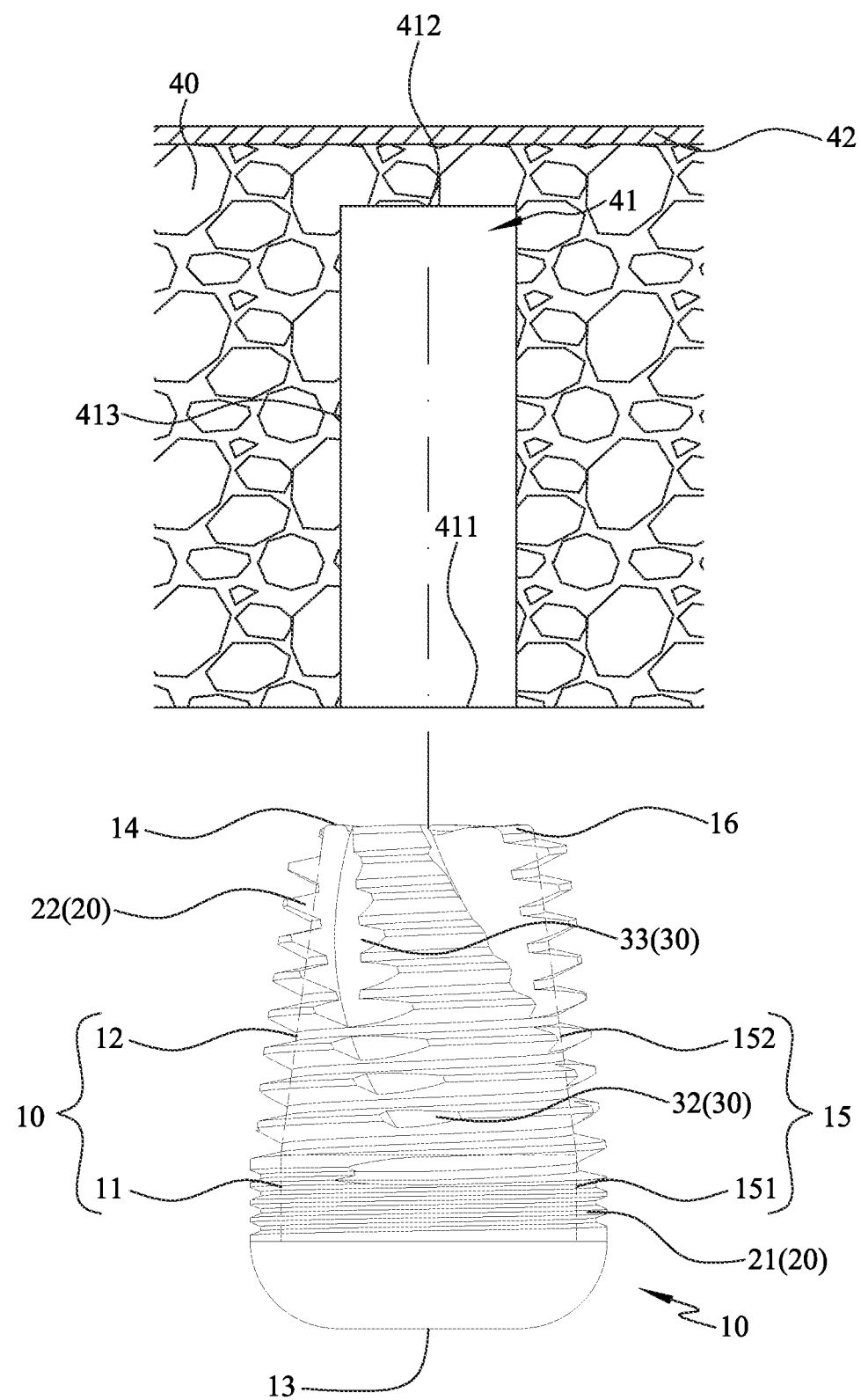
FIG. 2 shows a sinus dental implant according to the present invention before it is implanted into an alveolar hole.

Please refer to FIG. 2. A sinus dental implant 1 according to the present invention is configured for implanting into an alveolar hole 41 formed on a patient's upper gum 40, so that the sinus dental implant 1 can be extended into the patient's sinus area to press against a sinus membrane 42 therein. As shown in FIG. 2, the alveolar hole 41 has an opening 411 located at a surface of the upper gum 40 and a bottom 412 located at another end of the alveolar hole 41 opposite to the opening 411. The bottom 412 of the alveolar hole 41 is located beneath and spaced from the sinus membrane 42. And, the alveolar hole 41 has a side wall surface 413 defined between the opening 411 and the bottom 412.

Figure 3:
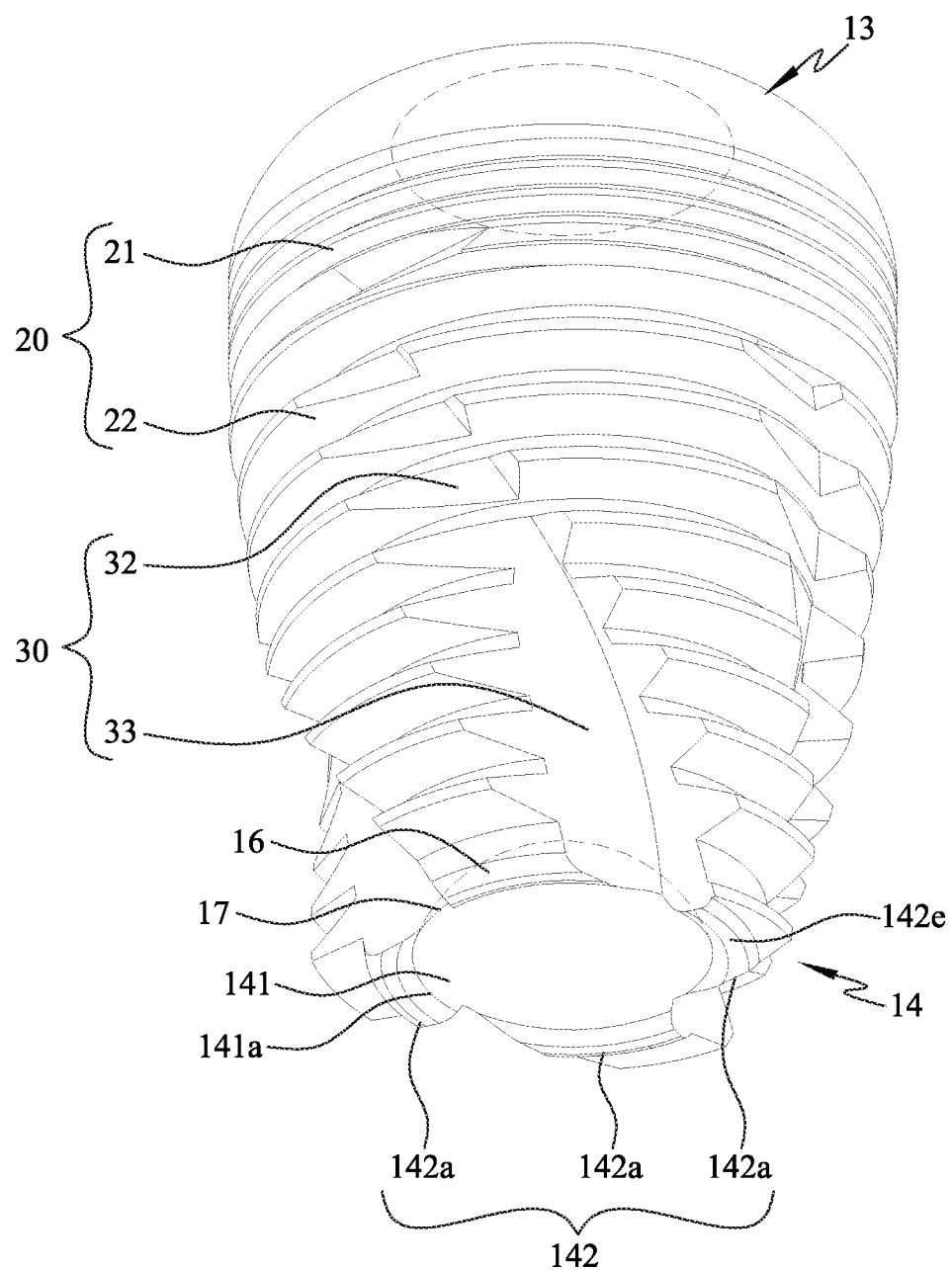
FIG. 3 is a perspective view of the sinus dental implant according to a first preferred embodiment of the present invention.
Figure 4:
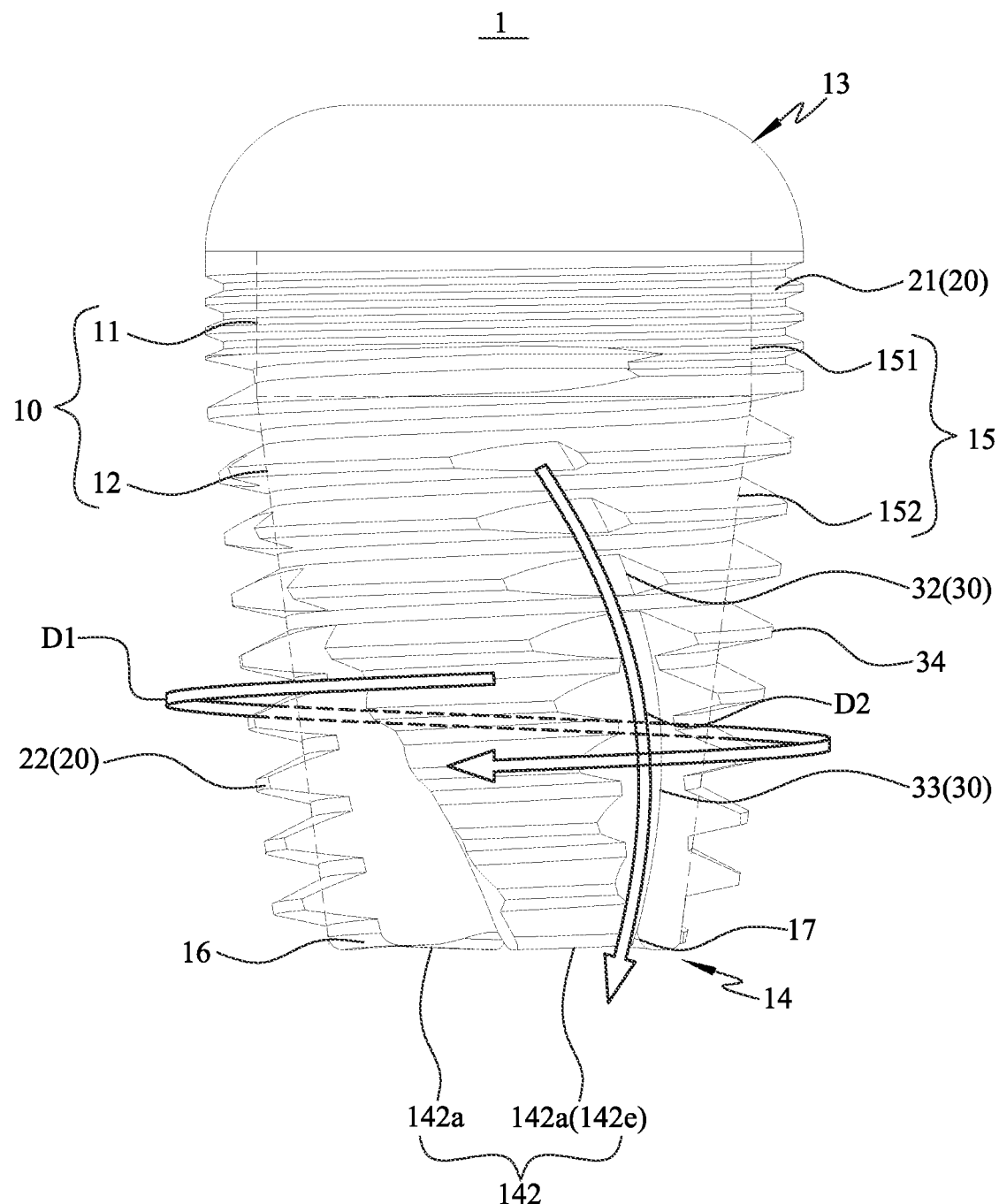
FIG. 4 is a side view of the sinus dental implant of FIG. 3.

Please refer to FIGS. 3 and 4. In a first preferred embodiment of the present invention, the sinus dental implant 1 mainly includes a main body 10, an external thread 20, and a plurality of spiral cutting flutes 30. The main body 10 includes a first implant section 11 having a cylindrical configuration and a second implant section 12 downward extended and tapered from the first implant section 11. An end of the first implant section 11 farther away from the second implant section 12 is a connection end 13, to which an artificial crown is connected. An end of the second implant section 12 opposite to the connection end 13 is a drilling end 14 for contacting with the bottom 412 of the alveolar hole 41. An outer circumferential surface of the main body 10 is defined as an embedment peripheral surface 15, which is in contact with the side wall surface 413 of the alveolar hole 41. As shown, a partial area of the embedment peripheral surface 15 externally formed around the first implant section 11 is defined as a first embedment peripheral surface 151, and the remaining area of the embedment peripheral surface 15 externally formed around the second implant section 12 is defined as a second embedment peripheral surface 152.

The drilling end 14 of the main body 10 has a sunken central area that forms a recess 141, and area of the drilling end 14 other than the recess 141 forms a drilling zone 142. The recess 141 has a recess opening 141a that is surrounded by the drilling zone 142; and the drilling zone 142 is configured for contacting with the bottom 412 of the alveolar hole 41. As shown, a turning area 16 is provided on the main body 10 between the embedment peripheral surface 15 and the drilling zone 142, so that the embedment peripheral surface 15 is limited to distribute over the outer circumferential surface of the main body 10 only, while the drilling zone 142 is located at a bottom surface of the main body 10. That is, being divided by the turning area 16, the embedment peripheral surface 15 and the drilling zone 142 are distributed over different areas of the main body 10.

Figure 5:
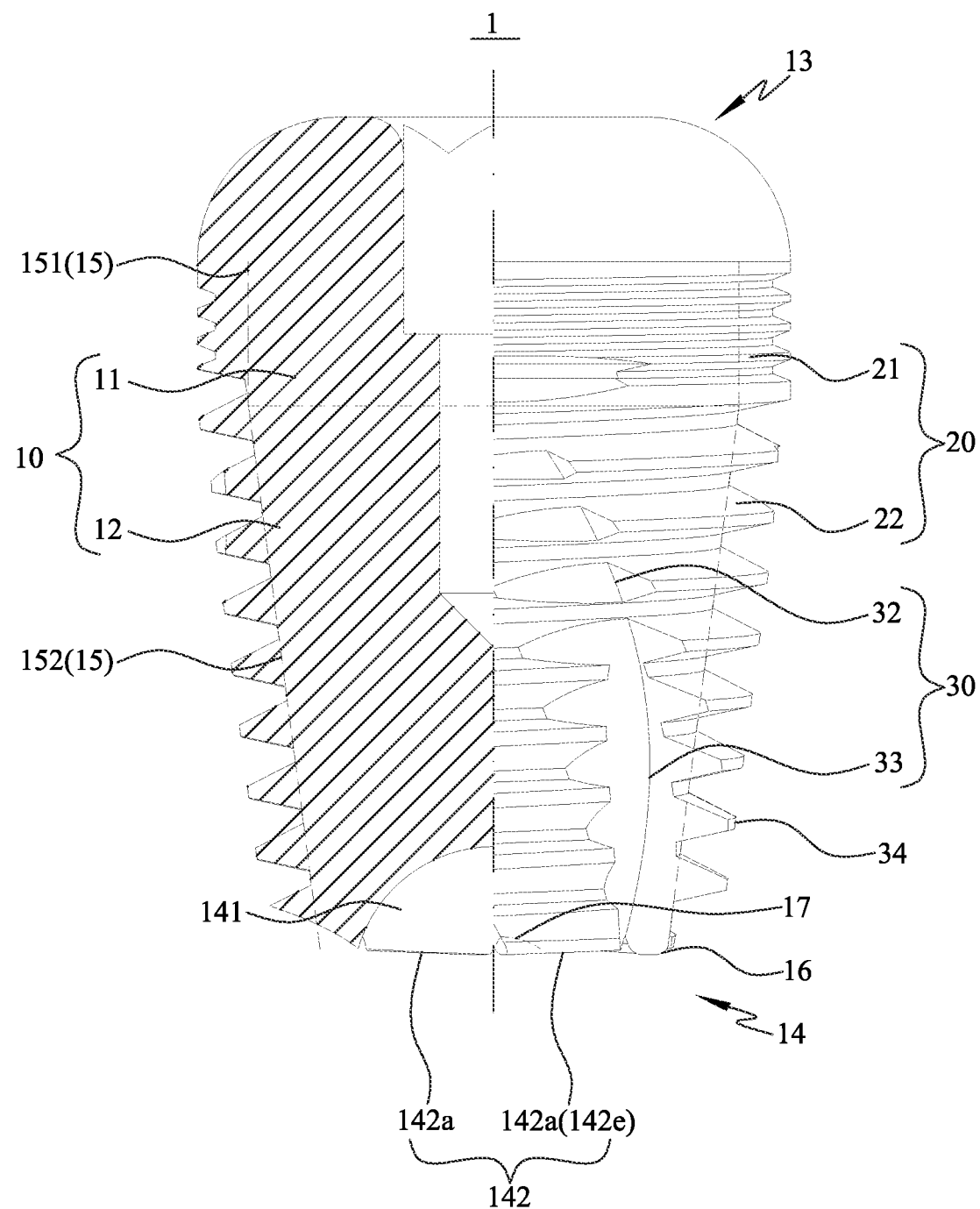
FIG. 5 is a partially sectioned side view of the sinus dental implant of FIG. 3.

Please refer to FIGS. 4 and 5. The external thread 20 of the sinus dental implant 1 is formed on the embedment peripheral surface 15 of the main body 10 to extend in a first spiral direction D1, such that the external thread 20 is spirally engaged with the side wall surface 413 of the alveolar hole 41. As shown in FIG. 4, a length of the external thread 20 distributed on the first embedment peripheral surface 151 surrounding the first implant section 11 is a fine thread 21; and other length of the external thread 20 distributed on the second embedment peripheral surface 152 surrounding the second implant section 12 is a coarse thread 22. That is, the fine thread 21 is located closer to the connection end 13 of the main body 10 while the coarse thread 22 is located closer to the drilling end 14 of the main body 10. The fine thread 21 has a pitch smaller than that of the coarse thread 22. In the first preferred embodiment, since the embedment peripheral surface 15 and the drilling zone 142 are divided by the turning area 16 to distribute on different areas of the main body 10, the external thread 20 is formed only on the embedment peripheral surface 15 without extending to the drilling zone 142 of the drilling end 14. Being blocked by the drilling zone 142 of the drilling end 14, the recess 141 of the main body 10 is spaced from the external thread 20. It is noted a height position of the drilling zone 142 relative to the whole main body 10 is lower than the lowest point of the external thread 20.

Figure 6:
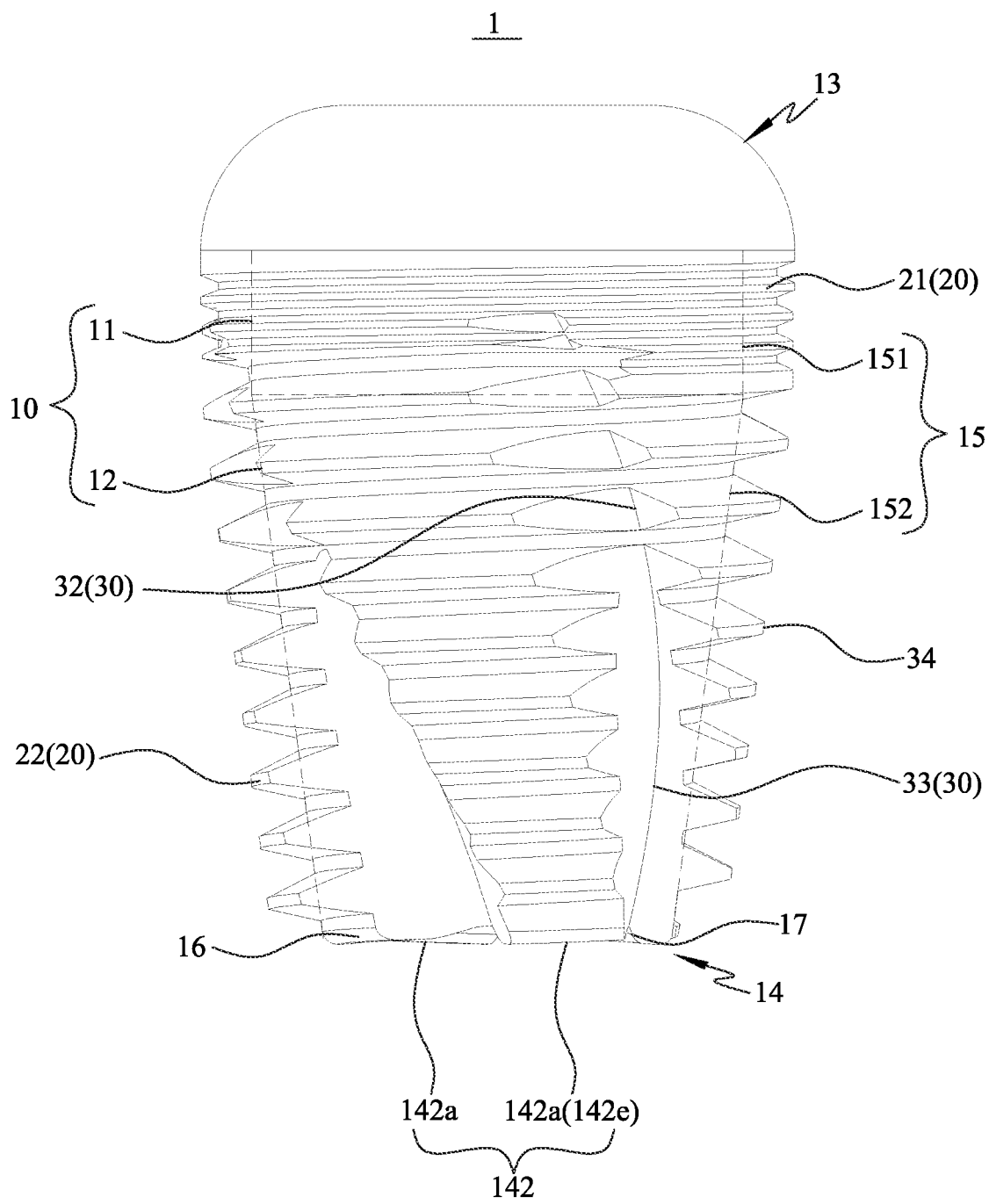
FIG. 6 shows spiral cutting flutes on a sinus dental implant according to an embodiment of the present invention are extended from a coarse thread to a fine thread formed on the sinus dental implant.

As shown in FIGS. 4 and 5, the spiral cutting flutes 30 are spirally equally spaced on the embedment peripheral surface 15 of the main body 10. Each of the spiral cutting flutes 30 is formed on the main body 10 and the external thread 20 to extend spirally from the drilling end 14 of the main body 10 in a second spiral direction D2, which is opposite to the first spiral direction D1, such that every spiral cutting flute 30 forms a cutting flute inlet 31 (see FIG. 7) at the drilling zone 142 of the drilling end 14. Further, a cut 17 located adjacent to the cutting flute inlet 31 is formed between each spiral cutting flute 30 and the recess 141, so that each of the spiral cutting flutes 30 is communicable with the recess 141 via the cut 17. In the first preferred embodiment, each of the spiral cutting flutes 30 includes a first cutting flute section 32 and a second cutting flute section 33 located adjacent to the first cutting flute section 32. The first cutting flute section 32 is located closer to the connection end 13 of the main body 10 and is formed only on a part of the coarse thread 22 of the external thread 20. The second cutting flute section 33 is located closer to the drilling end 14 of the main body 10 with the cutting flute inlet 31 formed at a lower end thereof. The second cutting flute section 33 is formed on both of the second implant section 12 and the remaining part of the coarse thread 22. That is, the spiral cutting flute 30 is not formed on the fine thread 21 surrounding the first implant section 11. However, it is understood the arrangement of the spiral cutting flutes 30 only on the coarse thread 22 without extending to the fine thread 21 is only illustrative to facilitate easy description of the present invention. In other embodiments, as shown in FIG. 6, the spiral cutting flutes 30 may extend through a full length of the coarse thread 22 into a part of the fine thread 21. That is, the spiral cutting flutes 30 are not formed in the remaining part of the fine thread 21. The radially outmost portion of each spiral cutting flute 30 is formed into a plurality of spirally arranged blade edges 34 for cutting the side wall surface 413 of the alveolar hole 41.

Figure 7:
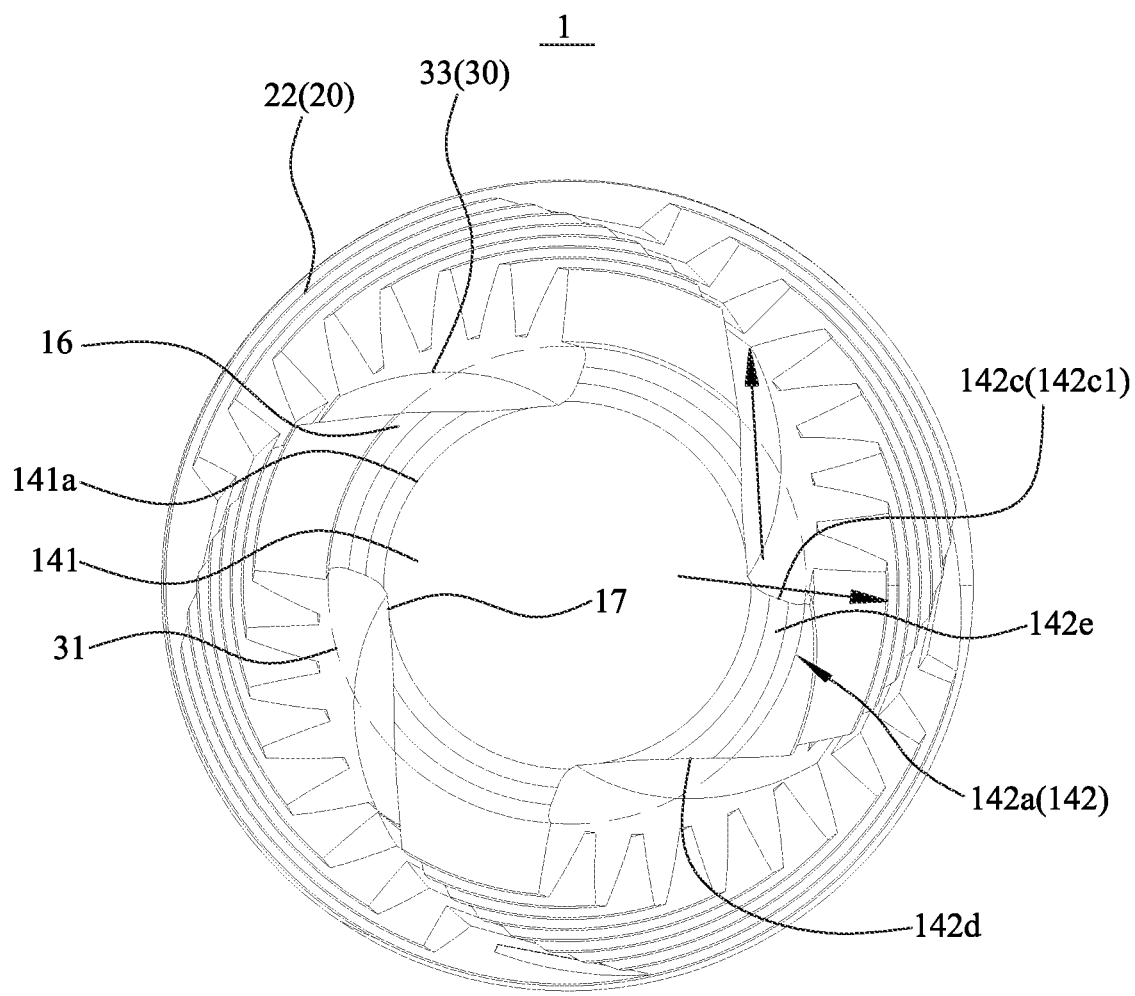
FIG. 7 shows a plurality of drilling segments is located around a recess formed at a drilling end of the sinus dental implant.
Figure 8:
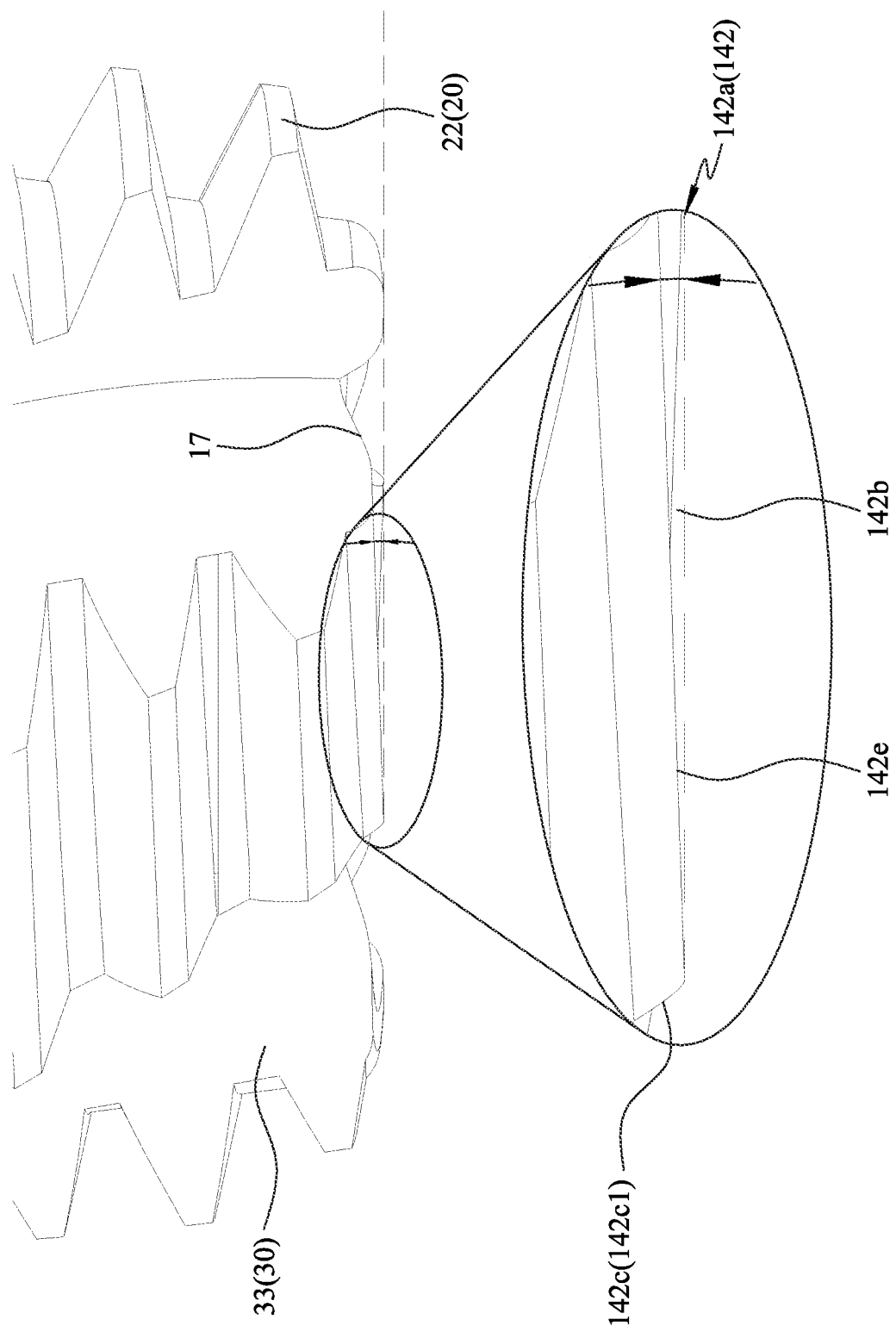
FIG. 8 shows the drilling end of the sinus dental implant of the present invention has slant guide surfaces formed thereat.

Please refer to FIGS. 7 and 8. The drilling zone 142 at the drilling end 14 is divided by the cutting flute inlets 31 of the spiral cutting flutes 30 into a plurality of drilling segments 142a, which are circumferentially spaced along the recess opening 141a, such that each of the cutting flute inlets 31 is located between two adjacent drilling segments 142a. As shown, every drilling segment 142a has a height gradually decreasing from one spiral cutting flute 30 along a contour of the recess opening 141a toward another adjacent spiral cutting flute 30, such that a guide space 142b is formed at every drilling segment 142a and located adjacent to the recess opening 141a. Portions of the drilling segment 142a at two opposite sides of the guide space 142b are located at different height positions, so that each of the drilling segments 142a includes a lower drilling portion 142c that has a lower height position and an upper drilling portion 142d that has a height position higher than the lower drilling portion 142c. The lower drilling portion 142c is located adjacent to one of the spiral cutting flutes 30, while the upper drilling portion 142d is located adjacent to another spiral cutting flute 30. Every guide space 142b is communicable with the recess 141 and the spiral cutting flute 30 on the main body 10, and every guide space 142b defines a guide surface 142e between the lower drilling portion 142c and the upper drilling portion 142d. Thus, the upper drilling portion 142d, the guide surface 142e, and the lower drilling portion 142c are sequentially formed on each of the drilling segments 142a in the first spiral direction D1. In the first preferred embodiment, the guide surface 142e has a gradient ranged between 1 to 10 degrees, which is smaller than a gradient of the external thread 20. Further, each of the lower drilling portions 142c includes a linear blade edge 142c1 capable of cutting the bottom 412 of the alveolar hole 41. The linear blade edges 142c1 respectively have a shape different from that of the spirally arranged blade edges 34 of the spiral cutting flutes 30 and are not connected to the spiral blade edges 34. Further, the lower drilling portions 142c are extended in a direction from a center of the recess 141 toward an outer periphery of the drilling zone 142, and the upper drilling portions 142d are extended in a direction tangential to the recess opening 141a.

Figure 9A:
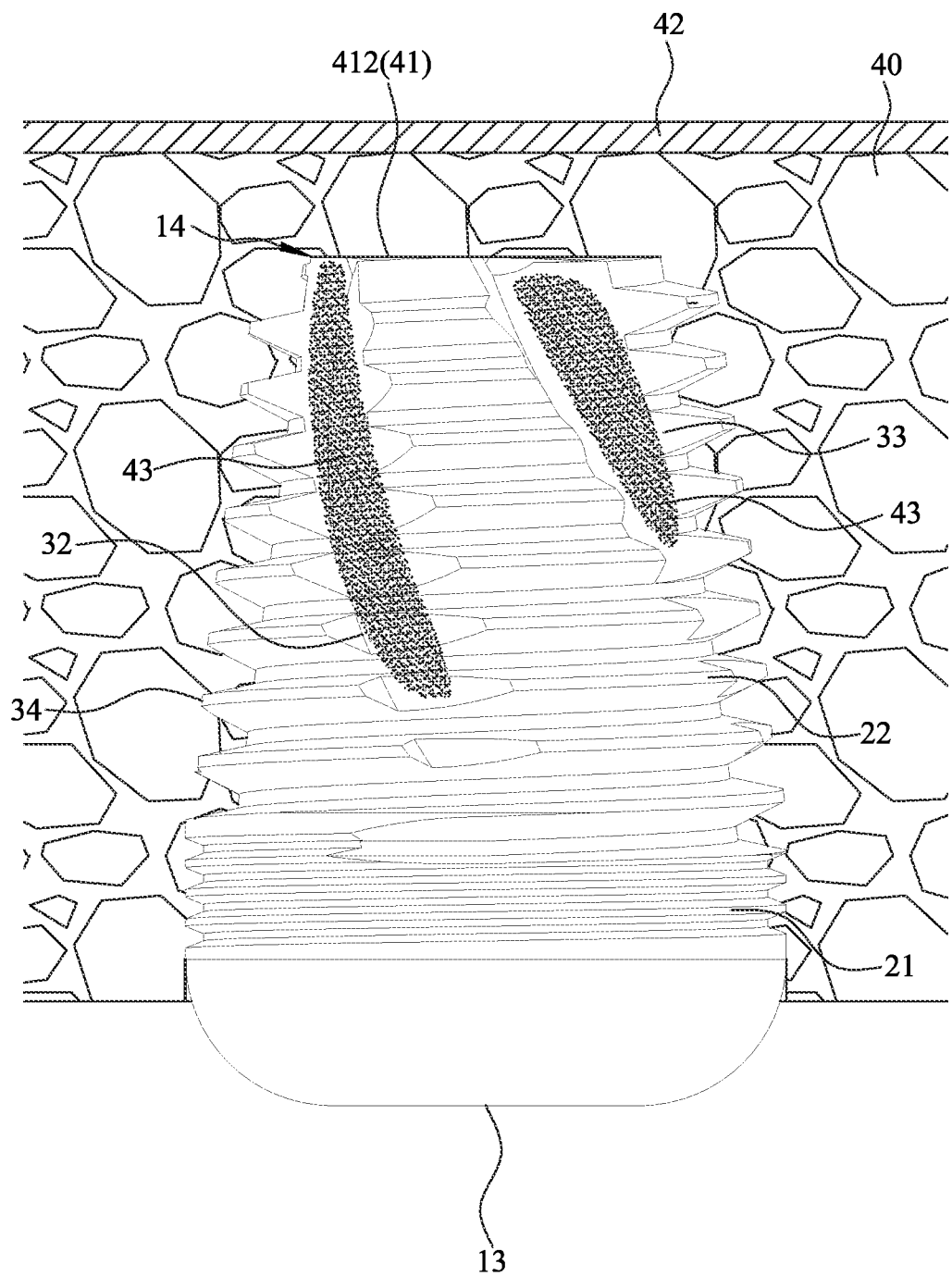
FIG. 9A shows the sinus dental implant of the present invention is in line contact with a bottom of the alveolar hole.
Figure 9B:
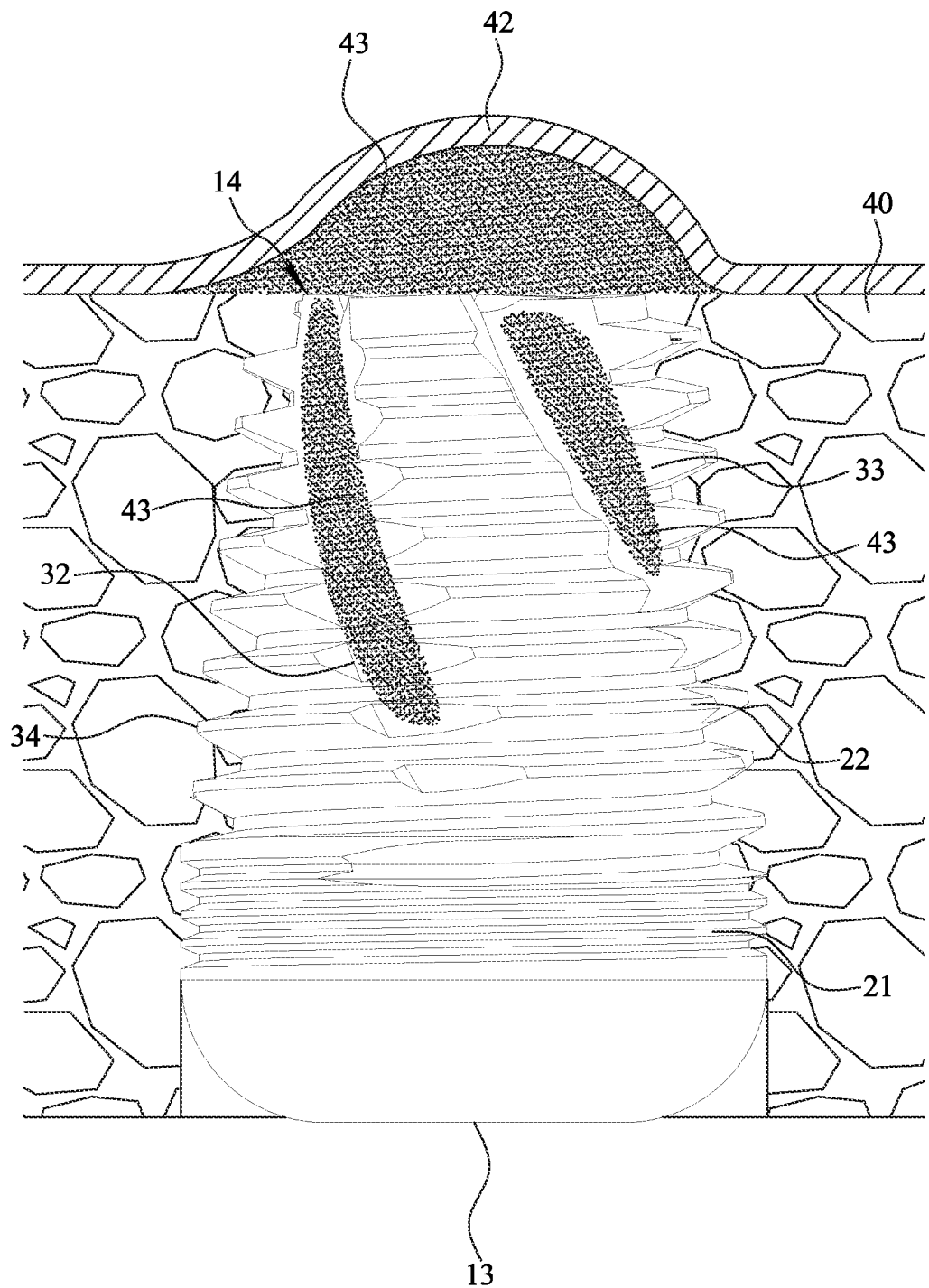
FIG. 9B shows bone debris is moved to a space between the sinus dental implant and a sinus membrane.

Please refer to FIGS. 9A and 9B. Before implanting the sinus dental implant 1 into the upper gum 40, the dentist first uses drill bits to cut and drill a hole into the upper gum 40, so as to form the alveolar hole 41 on the upper gum 40. Then, the sinus dental implant 1 is rotationally driven into the alveolar hole 41. When the sinus dental implant 1 reaches the bottom 412 of the alveolar hole 41, the lower drilling portions 142c are the parts of the sinus dental implant 1 that first contact with the bottom 412 of the alveolar hole 41 in line contact, which prevents the external thread 20 from contacting with the bottom 412. When the sinus dental implant 1 is further rotated to move forward, the linear blade edges 142c1 of the lower drilling portions 142c slowly cut the bottom 412 of the alveolar hole 41 without causing idling of the sinus dental implant 1; and the slow cutting of the lower drilling portions 142c avoids injuring the sinus membrane 42 due to excessive drilling of the bottom 412 of the alveolar hole 41. In the first preferred embodiment, in the process of implanting the sinus dental implant 1 into the alveolar hole 41, both of the linear blade edges 142c1 of the lower drilling portions 142c and the spiral blade edges 34 on the external thread 20 cut the upper gum 40 to create bone debris 43, which moves along the spiral cutting flutes 30 toward the recess 141 of the sinus dental implant 1, as shown in FIG. 9A. When the lower drilling portions 142c drill through an area of the upper gum 40 located between the bottom 142 of the alveolar hole 41 and the sinus membrane 42, the sinus dental implant 1 would gradually push against the sinus membrane 42, allowing the bone debris 43 to move into a space formed between the sinus dental implant 1 and the sinus membrane 42, as shown in FIG. 9B.

Figure 10:
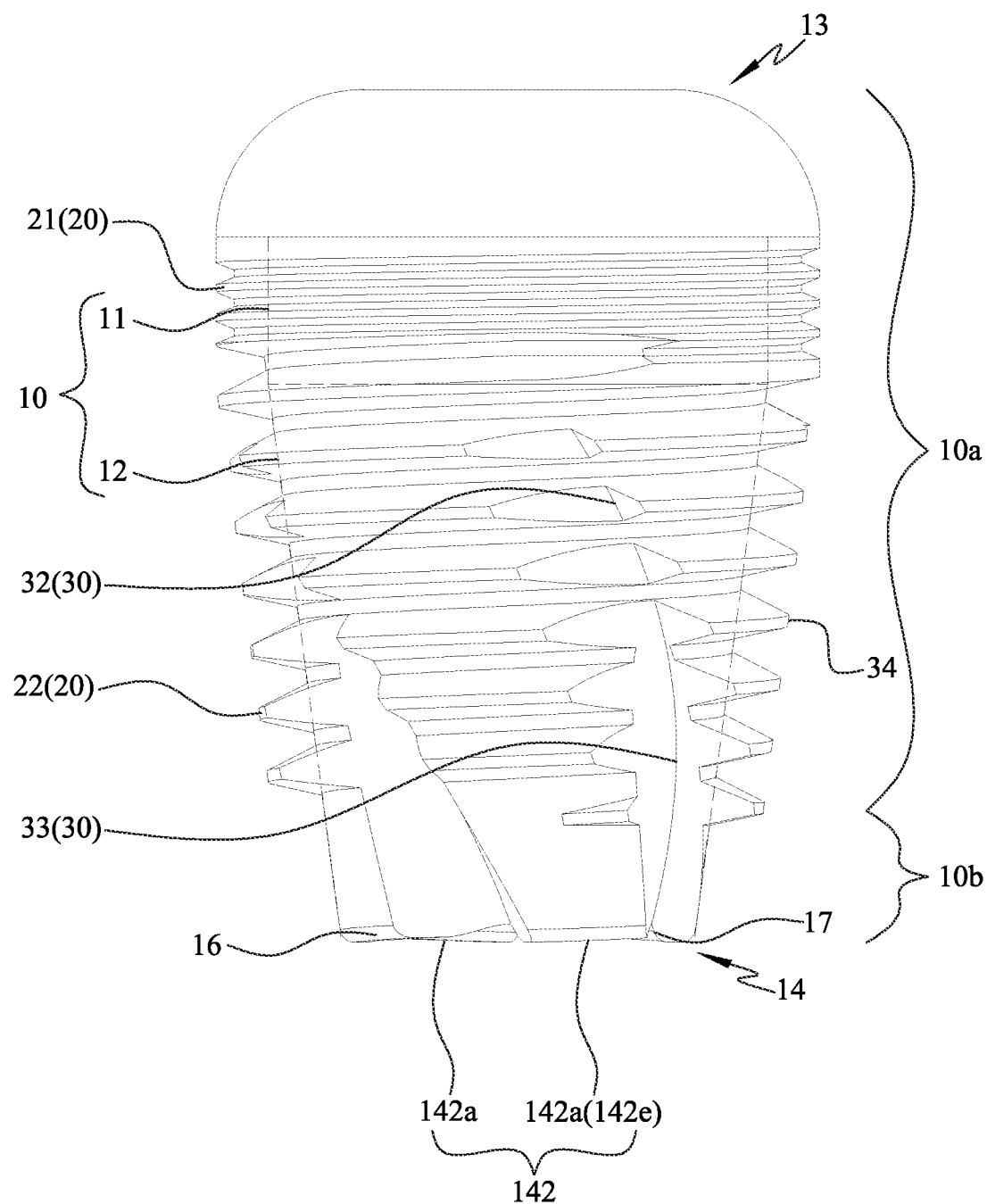
FIG. 10 is a side view of a sinus dental implant according to a second preferred embodiment of the present invention.

Please refer to FIG. 10, in which a sinus dental implant 1 according to a second preferred embodiment of the present invention is shown. In the second preferred embodiment, the sinus dental implant 1 also includes a main body 10, an external thread 20, and a plurality of spiral cutting flutes 30, which are structurally similar to those in the first preferred embodiment and are not repeatedly described herein. However, the second preferred embodiment is different from the first one in the position of the external thread 20 on the main body 10. As shown, in the second preferred embodiment, the fine thread 21 of the external thread 20 is similarly formed on the first embedment peripheral surface 151 around the first implant section 11, while the coarse thread 22 of the external thread 20 is formed only on a part of the second embedment peripheral surface 152 around the second implant section 12, such that the remaining part of the second embedment peripheral surface 152 around the second implant section 12 does not have the external thread 20 formed thereon. In the second preferred embodiment, the part of the main body 10 having the external thread 20 formed thereon is defined as a first implant body 10a, and the other part of the main body 10 having not the external thread 20 formed thereon is defined as a second implant body 10b. Wherein, the recess 141 is formed on the second implant body 10b.

Figure 11:
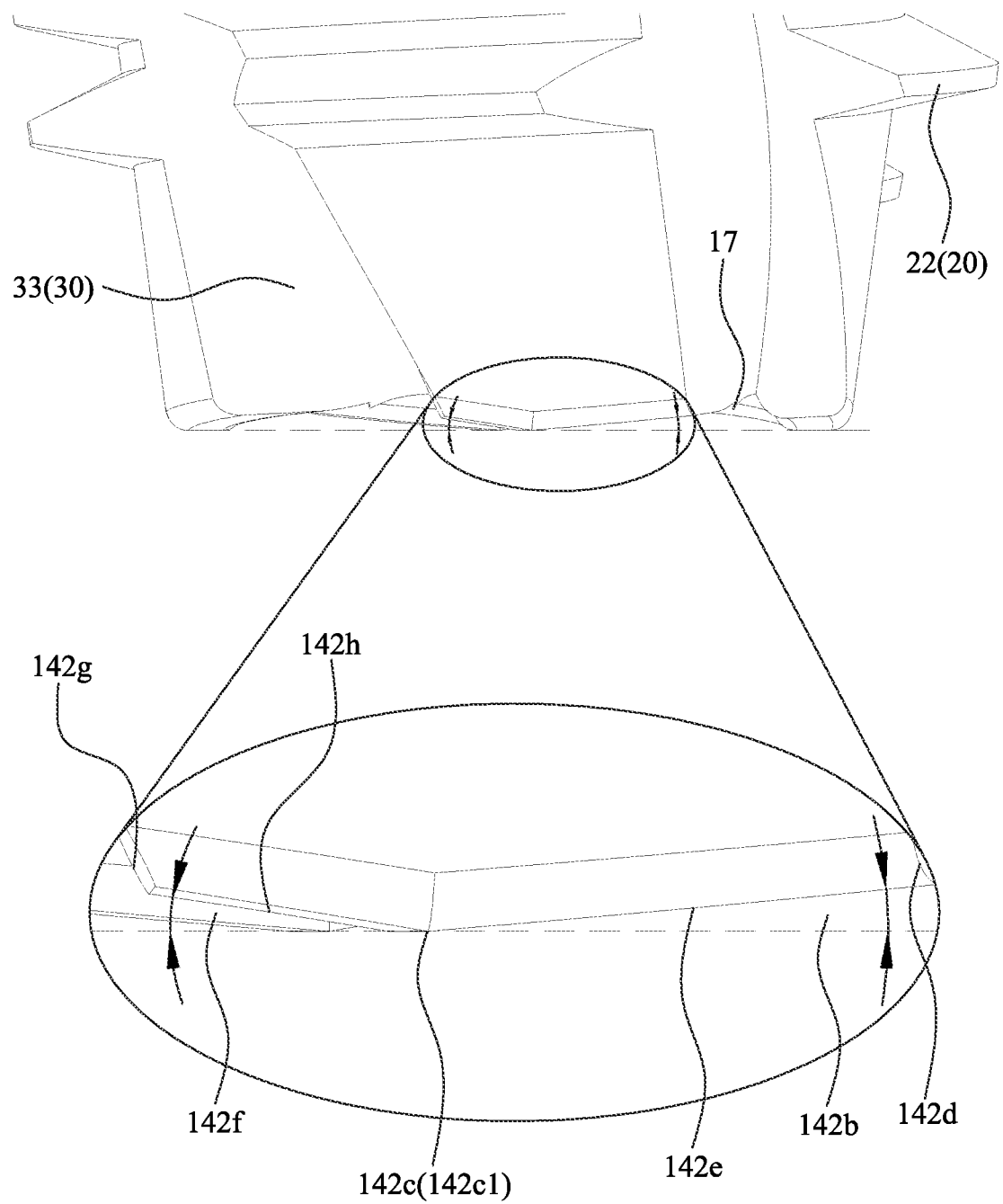
FIGS. 11 and 12 are fragmentary, enlarged side view and bottom view, respectively, of a sinus dental implant according to a third preferred embodiment of the present invention.
Figure 12:
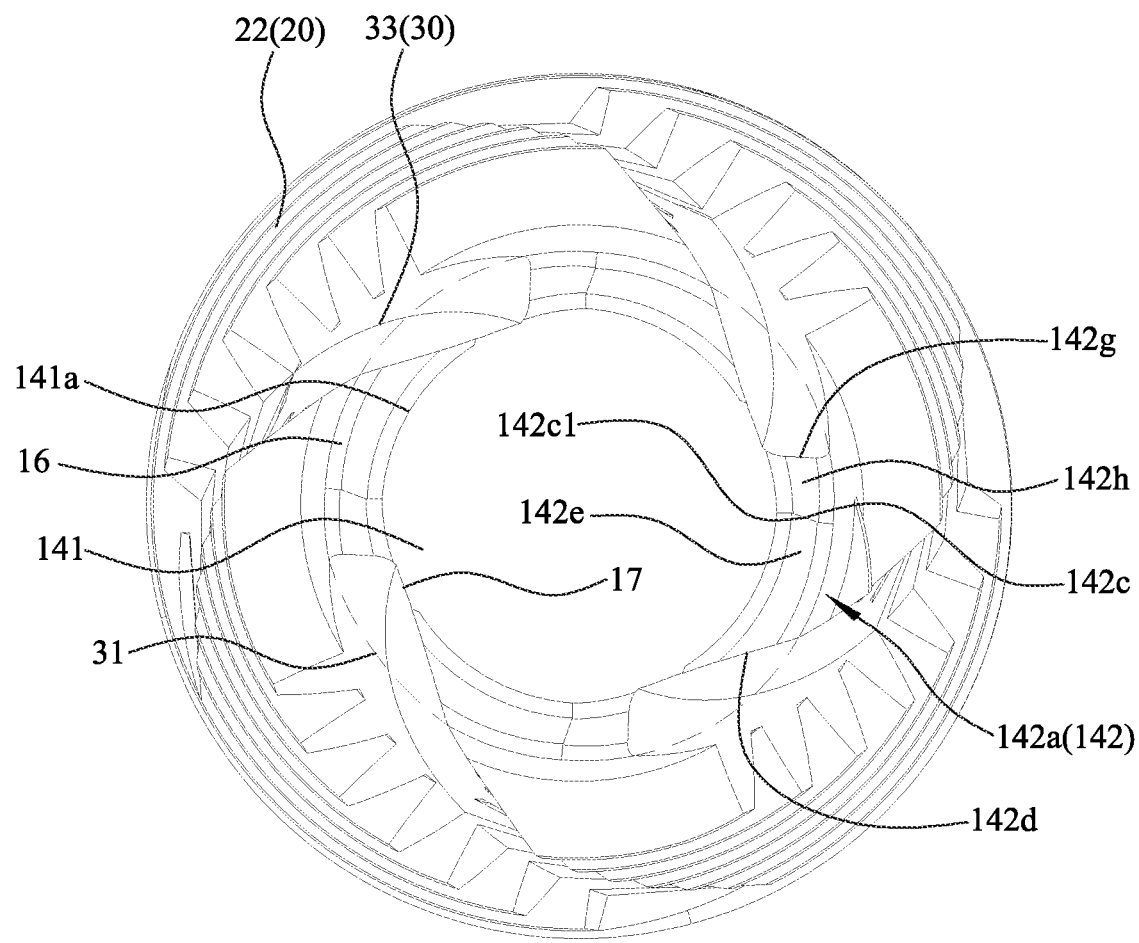

Please refer to FIGS. 11 and 12, in which a sinus dental implant 1 according to a third preferred embodiment of the present invention is shown. The third preferred embodiment is different from the second one in the drilling segments 142a of the drilling end 14. As shown, in the third preferred embodiment, each drilling segment 142a further rises in height from the lower drilling portion 142c along the recess opening 141a in a direction opposite to the guide space 142b until it reaches at the adjacent spiral cutting flute 30, such that a secondary guide space 142f is formed at every drilling segment 142a and located adjacent to the guide space 142b. Portions of the drilling segment 142a at two opposite sides of the secondary guide space 142f are located at different height positions, so that each of the drilling segments 142a includes a secondary upper drilling portion 142g having a height position higher than the lower drilling portion 142c. More specifically, the lower drilling portion 142c is located between the upper drilling portion 142d and the secondary upper drilling portion 142g of the drilling segment 142a; and the upper drilling portion 142d and the secondary upper drilling portion 142g are respectively located adjacent to one of the spiral cutting flutes 30. Each of the secondary guide spaces 142f defines a secondary guide surface 142h between the lower drilling portion 142c and the secondary upper drilling portion 142g. More specifically, the secondary guide surface 142h is a slanting surface slantly extended from the secondary upper drilling portion 142g toward the lower drilling portion 142c. Further, the secondary guide surface 142h and the guide surface 142e are inclined in two different directions.

Figure 13:
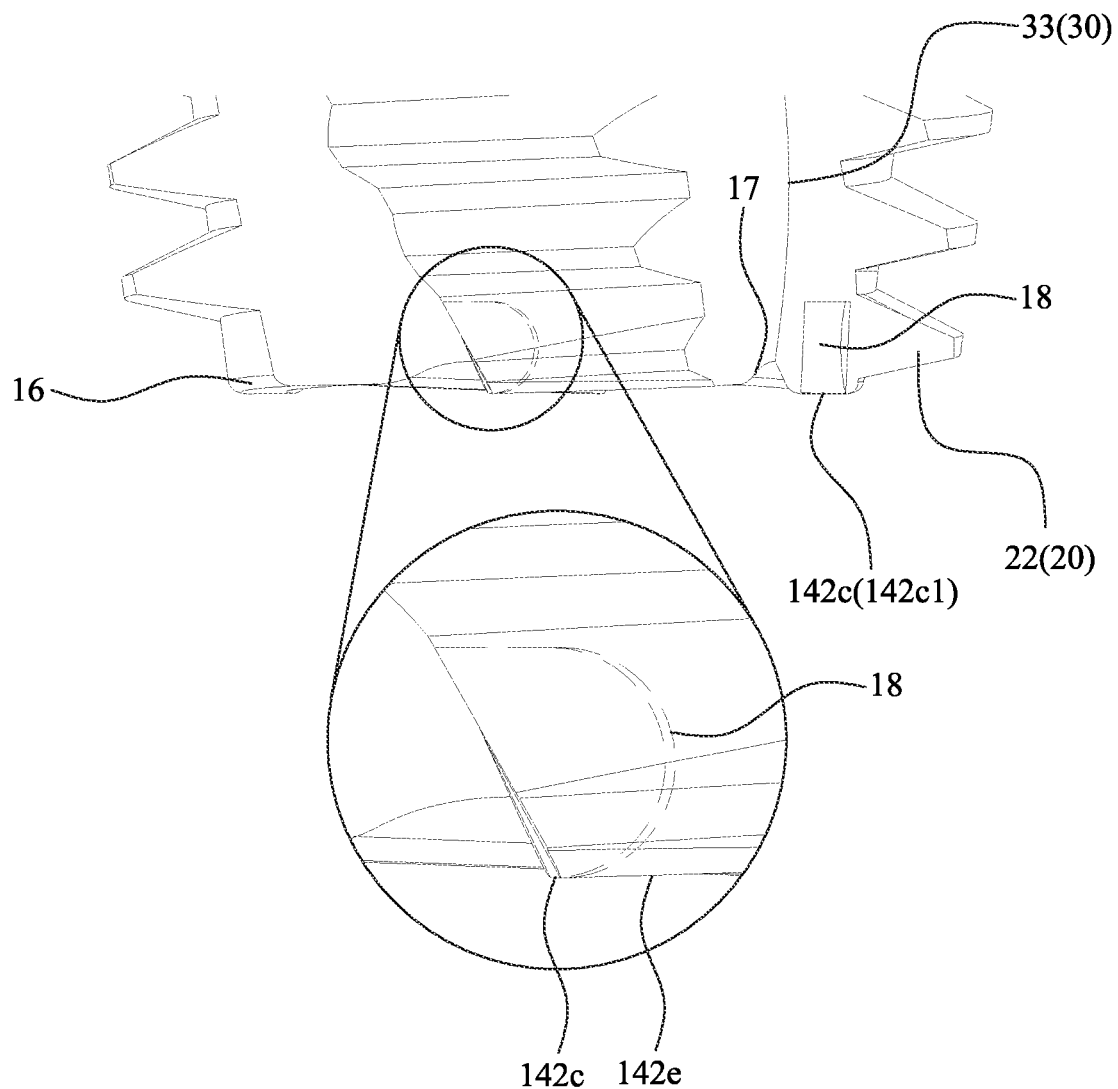
FIG. 13 is a fragmentary, enlarged side view of a sinus dental implant according to a fourth preferred embodiment of the present invention.

Please refer to FIG. 13, in which a sinus dental implant according to a fourth preferred embodiment of the present invention is shown. The fourth preferred embodiment is different from the first one in that the main body 10 thereof includes a plurality of notches 18 formed on the second implant section 12. Each of the notches 18 is sunken from a surface of one corresponding spiral cutting flute 30. The notch 18 has a contour located adjacent to the lower drilling portion 142c on the main body 10 to reduce an included angle of the linear blade edge 142c1 of the lower drilling portion 142c, making the linear blade edge 142c1 sharper. When the sinus dental implant 1 is in contact with the bottom 412 of the alveolar hole 41, the lower drilling portion 142c with the sharper linear blade edge 142c1 can cut the bottom 412 of the alveolar hole 41 more easily.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A sinus dental implant for implanting into an alveolar hole on a patient's upper gum, comprising:
 a main body having two opposite ends defined as a drilling end and a connection end, and an embedment peripheral surface extended from the drilling end toward the connection end, the drilling end having an outer peripheral area formed into a drilling zone capable of contacting with a bottom of the alveolar hole and a sunken central area formed into a recess surrounded by the drilling zone;

an external thread being formed on the embedment peripheral surface of the main body to extend in a first spiral direction for engaging with a side wall surface of the alveolar hole; and a plurality of spiral cutting flutes being formed on the main body and the external thread to extend from the drilling zone toward the connection end in a second spiral direction, which is opposite to the first spiral direction, and a cut being formed between every spiral cutting flute and the recess for communicating the spiral cutting flute with the recess, wherein the drilling zone is divided by the spiral cutting flutes into a plurality of drilling segments that are circumferentially spaced along the recess; and every drilling segment has a lowest portion defined as a lower drilling portion, from the lower drilling portion of the drilling segment rises gradually toward one of the spiral cutting flutes to form an upper drilling portion, so that a guide surface is formed between the lower drilling portion and the upper drilling portion while a guide space is also formed between the lower drilling portion and the upper drilling portion to communicate with the recess and the spiral cutting flute, when the sinus dental implant reaches the bottom of the alveolar hole, the lower drilling portions are parts of the sinus dental implant that contact with the bottom of the alveolar hole in line contact, and the guide surface is a slanting surface slantly extended from the lower drilling portion toward the upper drilling portion, a gradient of the slanting surface being smaller than a gradient of the external thread.

2. The sinus dental implant as claimed in claim 1, wherein the recess is blocked by the drilling zone to be spaced from the external thread, such that all lower drilling portions and all upper drilling portions are located between the recess and the external thread; and wherein a height position of the drilling zone relative to the main body is lower than a lowest point of the external thread relative to the main body, preventing the external thread from contacting with the bottom of the alveolar hole.

3. The sinus dental implant as claimed in claim 1, wherein every lower drilling portion is extended in a direction from a center of the recess toward an outer periphery of the drilling zone, and the upper drilling portions are extended in a direction tangential to an opening of the recess.

4. The sinus dental implant as claimed in claim 1, wherein every lower drilling portion is located adjacent to one of the spiral cutting flutes, and every upper drilling portion is located adjacent to another one of the spiral cutting flutes.

5. The sinus dental implant as claimed in claim 1, wherein the main body includes a plurality of notches, the notches are respectively formed on one of the spiral cutting flutes at a position adjacent to the lower drilling portion.

6. The sinus dental implant as claimed in claim 1, wherein whole external thread is formed only on a part of the embedment peripheral surface on the main body, such that the part of the main body with the external thread is defined as a first implant body, and other part of the main body without the external thread is defined as a second implant body; and the recess being formed on the second implant body.

7. The sinus dental implant as claimed in claim 1, wherein the upper drilling portion, the guide surface and the lower drilling portion on each of the drilling segments are sequentially arranged in the first spiral direction.

8. The sinus dental implant as claimed in claim 1, wherein the lower drilling portion is located at a middle position of every drilling segment, and the drilling segment further extends upward from the lower drilling portion toward another one of the spiral cutting flutes to form a secondary upper drilling portion that is located opposite to the upper drilling portion, such that a secondary guide surface is formed between the lower drilling portion and the secondary upper drilling portion; and the upper drilling portion and the secondary upper drilling portion being respectively located adjacent to one of the spiral cutting flutes.

9. The sinus dental implant as claimed in claim 1, wherein each of the lower drilling portions includes a linear blade edge capable of cutting the bottom of the alveolar hole, and each of the spiral cutting flutes has a radially outmost portion that is formed into a plurality of spirally arranged blade edges capable of cutting the alveolar hole; and a shape of the linear blade edges are respectively different from the spirally arranged blade edges.

* * * * *